(12) United States Patent
Hansen

(10) Patent No.: US 6,557,694 B2
(45) Date of Patent: May 6, 2003

(54) CONVEYOR SYSTEM AND VEHICLE SKID

(75) Inventor: Jan Hansen, Västra Frölunda (SE)

(73) Assignee: Volvo Personvagnar AB, Göteborg (SE)

( * ) Notice: Subject to any disclaimer, the term of this patent is extended or adjusted under 35 U.S.C. 154(b) by 0 days.

(21) Appl. No.: 09/681,588

(22) Filed: May 3, 2001

(65) Prior Publication Data

US 2001/0030108 A1 Oct. 18, 2001

Related U.S. Application Data

(63) Continuation of application No. PCT/SE99/01946, filed on Oct. 28, 1999.

(51) Int. Cl.$^7$ .............................................. B65G 29/00
(52) U.S. Cl. ........................... 198/465.1; 198/867.14; 198/465.3
(58) Field of Search ................. 198/465.1, 867.14, 198/465.3, 343.01, 343.02, 803.01

(56) References Cited

U.S. PATENT DOCUMENTS

| | | | |
|---|---|---|---|
| 4,078,499 A | | 3/1978 | Giraud |
| 4,279,337 A | * | 7/1981 | Kachnik ..................... 104/165 |
| 4,924,777 A | * | 5/1990 | Linton et al. ............. 104/172.2 |
| 5,018,418 A | * | 5/1991 | Nasu ........................ 198/343.1 |
| 5,062,368 A | * | 11/1991 | Sticht et al. .............. 104/172.3 |
| 5,065,678 A | * | 11/1991 | Rhodes ................... 104/130.09 |
| 5,388,684 A | * | 2/1995 | Peck ........................ 198/465.1 |
| 5,529,168 A | * | 6/1996 | Soriano et al. .......... 198/465.1 |
| 5,551,552 A | * | 9/1996 | Ophardt et al. .......... 198/465.1 |
| 5,735,384 A | * | 4/1998 | Lingo et al. ............. 198/343.1 |
| 6,070,534 A | * | 6/2000 | Lehrieder .............. 104/130.09 |
| 6,112,821 A | * | 9/2000 | Yokoi .......................... 169/37 |

FOREIGN PATENT DOCUMENTS

| | | |
|---|---|---|
| DE | 2733255 A1 | 2/1979 |
| EP | 0115551 A1 | 8/1984 |
| FR | 2381692 A1 | 9/1978 |

* cited by examiner

Primary Examiner—Christopher P. Ellis
Assistant Examiner—Richard Ridley
(74) Attorney, Agent, or Firm—Howrey, Simon, Arnold & White, LLP

(57) ABSTRACT

A conveyor system (10) for transporting a vehicle skid (14). The system includes a frame structure (24) extending along a longitudinal axis (26) and a plurality of support rollers (30) carried by the frame section. The support rollers are journaled for rotation about axes (32) transverse to the longitudinal axis and have a peripheral support surface (34) for supporting the vehicle skid. The system further includes drive means (36, 38, 42) for displacing the vehicle skid (14) along the frame structure (24). To permit rapid acceleration and braking of the vehicle skid, the drive means includes at least one continuous drive belt (36) having a toothed inner surface for engagement with a drive gear (38) and a toothed outer surface for engagement with a projection (40) on the vehicle skid.

34 Claims, 2 Drawing Sheets

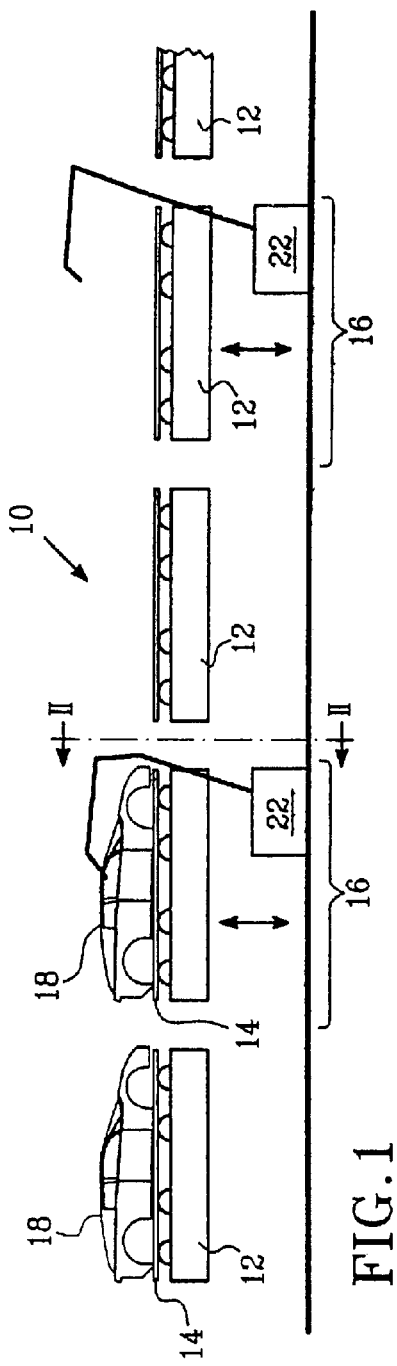
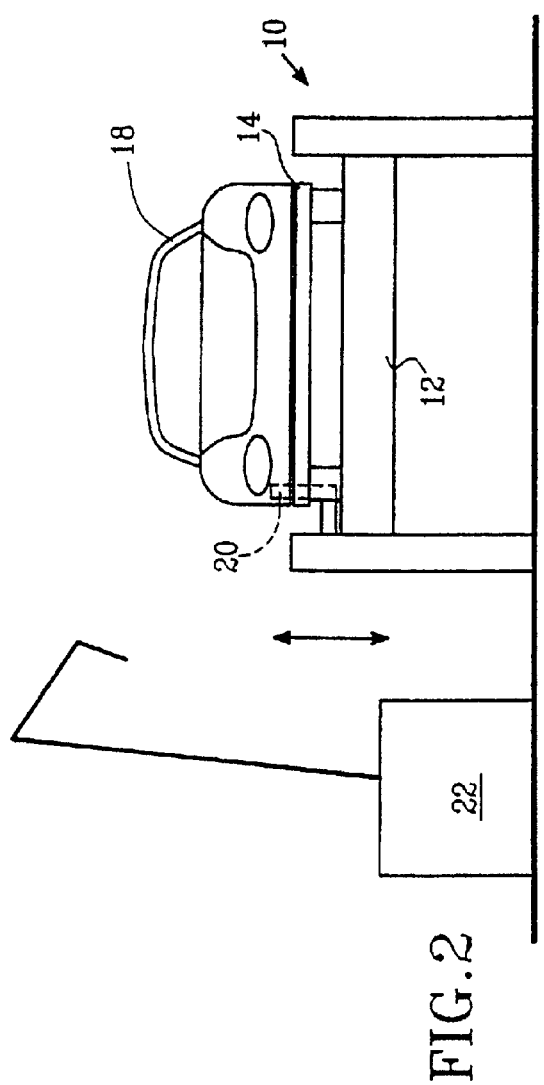
FIG. 1
FIG. 2

CONVEYOR SYSTEM AND VEHICLE SKID

CROSS REFERENCE TO RELATED APPLICATIONS

FIELD OF INVENTION

The present invention relates to a conveyor system for transporting a vehicle skid. The invention further relates to the vehicle skid that is adapted for use in a conveyor system.

BACKGROUND OF INVENTION

The body of a vehicle typically includes a large number of components that are assembled on a production line. These components can include a floor pan, stress-bearing panels for supporting suspension components, a passenger cage having A, B and C pillars, doors, as well as internal and external body panels. To increase production rates, assembly of vehicle bodies is becoming increasingly automated. Thus, a partially completed vehicle body is supported on a vehicle skid and passed down a production line between work stations at which various components are added to the partially completed vehicle body by robots. These robots include robots which accurately position components on the partially completed vehicle body, as well as welding robots to weld the components in place. At each work station, the vehicle skid is halted and lowered such that a reference hole in the partially completed vehicle body can be lowered around a reference pin associated with that work station. In this manner, the robot or robots at that work station know that the partially completed vehicle body is correctly positioned to allow the work at that station to be performed. Once the work at that station has been performed, the skid is raised so that the reference hole is raised clear of the reference pin and the skid is transported to the next work station.

Skids are generally transported between work stations using a conveyor system having a number of adjoining conveyor sections. Each conveyor section typically has a six meter long frame structure supporting a plurality of transversely extending shafts, with each shaft carrying a pair of support rollers. As is disclosed in EP-A-0 103 672 and EP-A-0 149 694, the transversely extending shafts may be driven by a common drive shaft to effect rotation of the support rollers. Alternatively, and as disclosed for example in EP-A-0 255 620, the transversely extending shafts may be driven by a drive belt arrangement. The support rollers contact support rails on the vehicle skid and friction between the rollers and rails causes the skid to be transported along the conveyor section.

In order that the partially completed vehicle bodies are correctly positioned at each work station, it is imperative that the conveyor system be able to stop the vehicle skid at a location with an accuracy of, for example, +−3 mm. Furthermore, useful work is carried out on the production line only at the work stations. Thus, the transfer time between work stations should advantageously be kept to a minimum. Given that a typical skid weighs 120 kg before adding any body components, it will be appreciated that a great deal of inertia is involved in accelerating and decelerating the skids. This characteristic is detrimental to the accuracy in trying to position the skid at each work station, particularly if the skids are transported between work stations at high speed.

SUMMARY OF INVENTION

It is an object of the present invention to provide a conveyor system that allows for shorter transfer time between work stations, but which nevertheless satisfies positional accuracy requirements.

Thus, since the drive means of a conveyor system that is configured in accordance with the present invention includes a drive belt having a toothed outer surface for engagement with a projection on the vehicle skid, an interlocking, rather than purely frictional engagement between the drive means and the skid is attained. This allows the skid to be subjected to greater acceleration and decceleration forces without loss of positional accuracy.

The invention further provides for a skid that is equipped with a suitable projection for engagement with the toothed outer surface of the drive belt of the conveyor system of the present invention.

BRIEF DESCRIPTION OF DRAWINGS

The invention will be described in greater detail in the following by way of example only and with reference to embodiments shown in the attached drawings, in which:

FIG. 1 is a schematic elevational view of a conveyor system configured according to the present invention and which makes up a part of a vehicle production line;

FIG. 2 is a schematic end view taken along line II—II of FIG. 1, and

DETAILED DESCRIPTION

Figure 3:
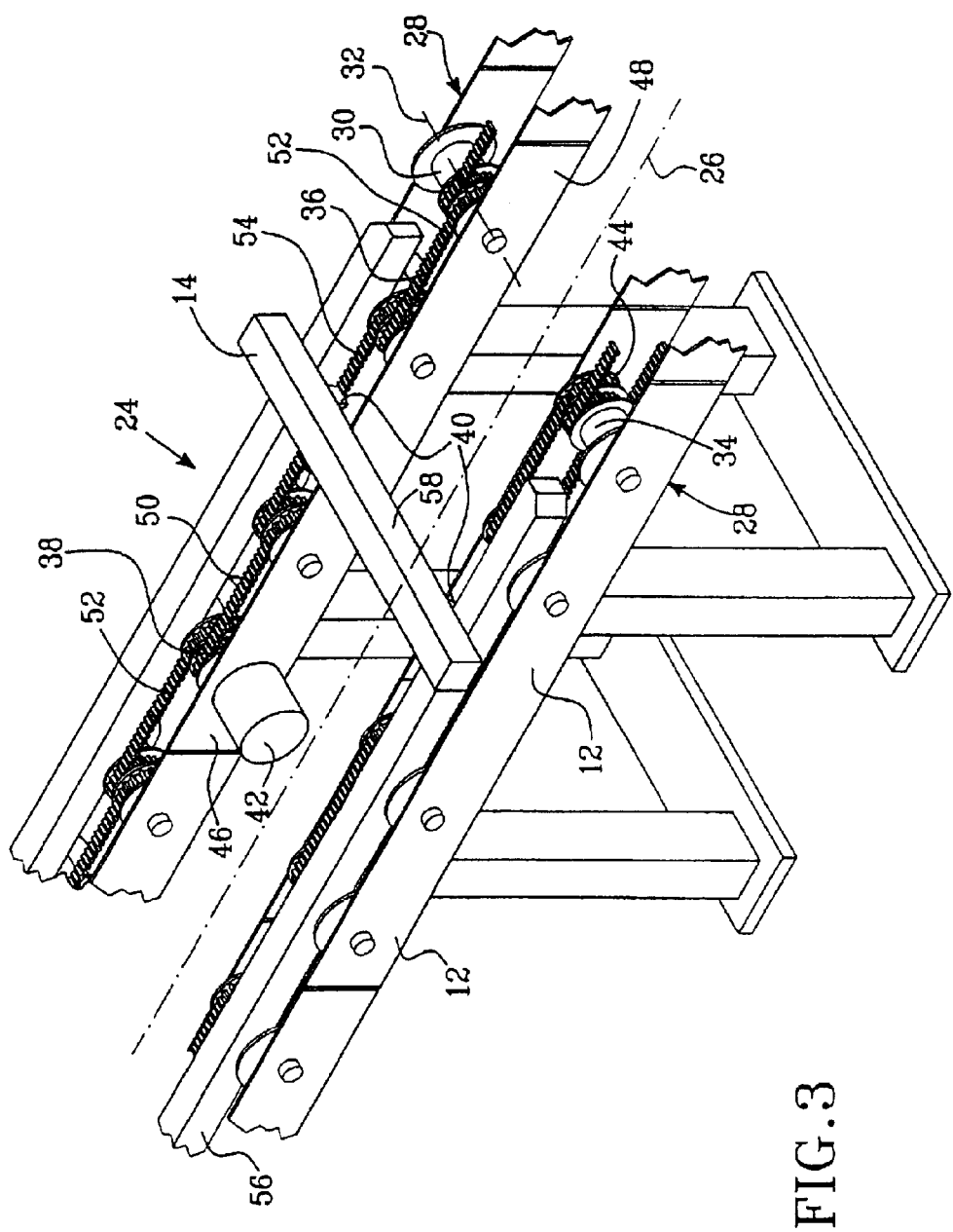
FIG. 3 is a schematic perspective view of the conveyor system configured according to the present invention.

In the drawings, reference numeral 10 generally denotes a conveyor system configured according to the present invention. The conveyor system is made up of a number of adjoining conveyor sections 12. The conveyor sections 12 are arranged such that a vehicle skid 14 can be transported along the sections between work stations 16. Each skid 14 carries a partially completed vehicle body 18. When the skid 14 arrives at a work station 16, the conveyor section 12 at that work station is lowered so that a reference pin 20, that can be seen in FIG. 2, enters a reference hole in the partially completed vehicle body 18. Once the conveyor section 12 is in the lowered position, one or more robots 22 that are associated with that particular work station are able to perform operations on the partially completed vehicle body. Upon completion of the prescribed operations at the work station, the conveyor section 12 is raised so that the reference hole in the partially completed vehicle body is raised clear of the reference pin 20. The skid 14 that is carrying the vehicle body is then transported to the next work station for a subsequent operation to be completed thereupon.

Referring to FIG. 3, a conveyor system configured according to the present invention is shown and that includes a frame structure 24 making up a conveyor section 12. The frame structure 24 extends along a longitudinal axis 26. In the illustrated and preferred embodiment, the frame structure 24 has a pair of parallel frame sections 28. The frame structure 24 carries a plurality of support rollers 30 that are journaled for rotation about axes 32 that are oriented transversely to the longitudinal axis 26 of the frame structure 24. Each support roller 30 has a peripheral support surface 34 for supporting the vehicle skid 14. To displace the skid 14 along the frame structure, the conveyor system is provided with drive means. In accordance with the present invention, the drive means includes at least one continuous drive belt 36 having a toothed inner surface for engagement with a drive gear 38 and a toothed outer surface for engagement with a projection 40 on the vehicle skid 14. The drive gear 38 is suitably connected to a motor 42, for example an electric motor, carried on the frame structure 24.

In addition to the peripheral support surface 34, each support roller 30 has a belt contact surface 44 adjacent the support surface for contact with at least one drive belt 36. Advantageously, the belt contact surface 44 may be provided with teeth for meshing with the teeth on the inner surface of the drive belt. In the embodiment shown in FIG. 3, the frame section includes a first end support roller at a first end 46 of the frame section, a second end support roller at a second end 48 of the frame section and two intermediate support rollers 60 located between the first end support roller and the second end support roller. Thus, the drive belt arrangement includes a first drive belt 50 arranged between the first end support roller and the adjacent intermediate support roller 60, a second drive belt 52 arranged between a second end support roller and its adjacent intermediate support roller 60, and a third drive belt 54 arranged between adjacent intermediate support rollers 60. Thus, the belt contact surface of the intermediate support rollers 60 is sufficiently wide to permit two adjacent drive belts to contact the surface.

The vehicle skid 14 which is to be used with the conveyor system of the present invention has at least one, and as shown, two, substantially planar support rails 56 which are adapted to rest on the support surfaces 34 of the support rollers 30. The skid further includes at least one projection 40 that is adapted to engage the toothed outer surface of the drive belts 36. To this end, the projection 40 has an extension oriented transversely to the longitudinal axis 26 of the frame structure 24 of the conveyor system over substantially the entire axial extension of the belt contact surfaces 34 of the support rollers 30. The projection may suitably be affixed to a transverse frame member 58 connecting the two planar support rails of the skid 14. In the illustrated embodiment, the transverse frame member 58 carries two such projections, one for engagement with the belts of the one frame section and one for engagement with the belts of the other frame section.

The projection or projections 40 are arranged on the skid 14 such that when the skid is also supported by intermediate support rollers, approximately half the extension of the projection is in engagement with the toothed outer surface of the drive belt when the projection 40 is between support rollers 30. Thus, at the intermediate support rollers, approximately half the projection engages one drive belt and approximately half the projection engages an adjacent drive belt, the two drive belts both contacting the belt contact surface 44 of the support roller. In this manner the projection is smoothly transferred from one drive belt to the next.

The conveyor system 10 in accordance with the present invention operates in the following manner.

A skid 14 carrying a partially completed vehicle body 18 is supported on a first conveyor section 12 such that the projections 40 on the skid engage with respective drive belts 36 carried by support rollers 30 of the conveyor section. When it is desired to transport the skid 14 to a subsequent conveyor section, the motors 42 of the conveyor sections are activated such that the drive belts start running. As a result of engagement of the projections 40 with the drive belts and friction between the support rails 56 of the skid 14 and the support surfaces 34 of the support rollers 30, the skid 14 is transported along the first conveyor section to the next. When the skid 14 arrives at a conveyor section corresponding to a work station 16, the motors of the conveyor section are de-energized such that the skid 14 is brought to a halt at a predetermined position. The fact that there is an interlocking engagement between the projections 40 on the skid 14 and the toothed outer surface of the drive belts implies that the skid 14 can be braked and accelerated relatively quickly without risk of the skid sliding on the support rollers.

Once the skid 14 has reached its predetermined position on the conveyor section, the conveyor section is lowered such that the reference pin 20 enters the reference hole on the partially completed vehicle body. The robot or robots 22 are then able to perform their intended tasks. When the robots have completed their intended tasks, the conveyor section is raised until it is aligned with the subsequent conveyor section and the skid can be transported further by activation of the respective motors 42.

It is to be understood that the invention is not restricted to the embodiments described above and shown in the drawings, but may be varied within the scope of the appended claims. For example, opposite support rollers of the parallel frame sections may be carried on a common shaft extending transverse to the longitudinal axis of the frame structure.

What is claimed is:

1. A conveyor system for transporting a vehicle skid, said system comprising:

a frame structure extending along a longitudinal axis;

a plurality of support rollers carried by said frame section, said support rollers being journaled for rotation about axes transverse to said longitudinal axis and having a peripheral support surface for supporting said vehicle skid, and drive means for displacing said vehicle skid along said frame structure, wherein said drive means comprises at least one continuous drive belt, said drive belt having a toothed inner surface for engagement with a drive gear and a toothed outer surface for engagement with a projection on said vehicle skid.

2. The conveyor system as recited in claim 1, wherein said frame structure comprises a pair of parallel frame sections, each frame section carrying a number of said plurality of support rollers.

3. The conveyor system as recited in claim 2, wherein said support rollers of at least one of said frame sections have a belt contact surface for contact with said at least one drive belt.

4. The conveyor system as recited in claim 3, wherein said belt contact surface is toothed.

5. The conveyor system as recited in claim 3, wherein said support rollers of said frame section comprise a first end support roller at a first end of said frame section, a second end support roller at a second end of said frame section and an intermediate support roller located between said first end support roller and said second end support roller, wherein said at least one drive belt comprises a first drive belt between said first end support roller and said intermediate support roller, and a second drive belt between said intermediate support roller and said second end support roller.

6. The conveyor system as recited in claim 5, wherein said support rollers of said frame section further comprise a plurality of intermediate support rollers, and in that said at least one drive belt further comprises third drive belts between adjacent intermediate support rollers.

7. The conveyor system as recited in claim 3, wherein said belt contact surface of said intermediate support rollers is sufficiently wide to permit two adjacent drive belts to contact said surface.

8. The conveyor system as recited in claim 1, wherein said vehicle skid comprises a substantially planar support rail adapted to rest on said support surfaces of said support rollers, and a projection for engagement with said toothed outer surface of said at least one drive belt.

9. The conveyor system as recited in claim 8, wherein, when said skid is supported by said support rollers, said projection has an extension transverse to the longitudinal axis of the frame structure of the conveyor system over substantially the entire axial extension of said belt contact surfaces of said support rollers.

10. The conveyor system as recited in claim 8, said skid being supported by intermediate support rollers and said projection being between said support rollers, wherein said projection is arranged on said skid such that approximately half said extension of said projection is in engagement with said toothed outer surface of said drive belt.

11. The conveyor system as recited in claim 8, wherein said skid comprises two substantially planar support rails connected by at least one transverse frame member, wherein said transverse frame member carries said projection.

12. The conveyor system as recited in claim 11, wherein said transverse frame member carries two projections such that when said skid is supported by a conveyor system having a frame structure comprising a pair of parallel frame sections, one of said two projections can engage a drive belt carried by support rollers in one frame section, and the other projection can engage a drive belt carried by support rollers in the other frame section.

13. An arrangement for transporting a vehicle skid, said arrangement comprising:
    a support roller arranged for rotation on a frame, said support roller having a peripheral support surface configured for supporting a vehicle skid; and
    a driving arrangement configured for displacing a vehicle skid along said frame, said driving arrangement having a drive belt, said drive belt having a toothed inner surface configured for engagement with a drive gear and a toothed outer surface for engagement with a projection on a vehicle skid.

14. The arrangement as recited in claim 13, further comprising:
    said support roller being a member of a plurality of support rollers, each of said plurality of support rollers being similarly configured for rotation on said frame.

15. The arrangement as recited in claim 14, further comprising:
    said frame having a pair of parallel frame sections, each of said frame sections supporting a number of said plurality of support rollers.

16. The arrangement as recited in claim 15 further comprising:
    said number of said plurality of support rollers each having a belt contact surface configured for slip-free engagement with said drive belt.

17. The arrangement as recited in claim 16, further comprising:
    said belt contact surface is of a toothed configuration.

18. The arrangement as recited in claim 15, further comprising:
    each of said frame sections carrying a first end support roller at a first end of said frame section, a second end support roller at a second end of said frame section and an intermediate support roller located between said first end support roller and said second end support roller; and
    said driving arrangement including a plurality of drive belts, said plurality of drive belts having a first drive belt spanning between said first end support roller and said intermediate support roller and a second drive belt spanning between said intermediate support roller and said second end support roller.

19. The arrangement as recited in claim 18, further comprising:
    said number of support rollers includes a plurality of intermediate support rollers; and
    a third drive belt is arranged to span between adjacent intermediate support rollers.

20. The arrangement as recited in claim 19, further comprising:
    a belt contact surface of each of said intermediate support rollers is sufficiently wide to permit two drive belts to be adjacently carried on said belt contact surface.

21. The arrangement as recited in claim 13, further comprising:
    a vehicle skid having a support rail adapted to rest on said peripheral support surface of said support roller and a projection for engagement with said toothed outer surface of said drive belt.

22. The arrangement as recited in claim 13, further comprising:
    said projection extending transversely to a longitudinal axis of the frame of the arrangement when said skid is supported on said support roller over a substantial entirety of said belt contact surface.

23. The arrangement as recited in claim 13, further comprising:
    said projection being arranged on said skid so that when said skid is also supported by intermediate support rollers approximately half of said extension of said projection is in engagement with said toothed outer surface of each of two drive belts when said projection is between support rollers.

24. A conveyor system for transporting a vehicle skid, the system comprising:
    a frame structure extending along a longitudinal axis;
    a plurality of support rollers carried by the frame section, the support rollers being journaled for rotation about axes transverse to the longitudinal axis and having a peripheral support surface for supporting the vehicle skid;
    drive means for displacing the vehicle skid along the frame structure, the drive means having at least one continuous drive belt, the drive belt having a toothed inner surface for engagement with a drive gear and a toothed outer surface for engagement with a projection on the vehicle skid;
    a pair of parallel frame sections, each frame section carrying a number of the plurality of support rollers;
    the plurality of support rollers of at least one of said frame sections having a belt contact surface for contact with the at least one drive belt;
    the plurality of support rollers of said frame section further comprising a first end support roller at a first end of the frame section, a second end support roller at a second end of the frame section and at least one intermediate support roller located between the first end support roller and the second end support roller; and
    the at least one drive belt further comprising a first drive belt between the first end support roller and the at least one intermediate support roller, and a second drive belt between the at least one intermediate support roller and the second end support roller.

25. The conveyor system as recited in claim 24, the plurality of support rollers of the frame section further comprising a plurality of intermediate support rollers, and the at least one drive belt further comprising third drive belts between adjacent intermediate support rollers.

26. The conveyor system as recited in claim 24, wherein the belt contact surface of the at least one intermediate support rollers is sufficiently wide to permit two adjacent drive belts to contact the contact surface.

27. A conveyor system for transporting a vehicle skid, the conveyor system comprising:

a frame structure extending along a longitudinal axis;

a plurality if support rollers carried by the frame section, the support rollers being journaled for a rotation about axes transverse to the longitudinal axis and having a peripheral support surface for supporting the vehicle skid;

drive means for displacing the vehicle skid along the frame structure, wherein the drive means comprises at least one continuous drive belt, the drive belt having a toothed inner surface for engagement with a drive gear and a toothed outer surface for engagement with a projection on the vehicle skid; and the vehicle skid, the vehicle skid having a substantially planar support rail adapted to rest on the support surfaces of the support rollers and a projection for engagement with the toothed outer surface of the at least one drive belt, wherein, when the vehicle skid is supported by the support rollers, the projection has an extension transverse to the longitudinal axis of the frame structure of the conveyor system over substantially the entire axial extension of the belt contact surfaces of the support rollers, and wherein the projection is arranged on the skid such that when the skid is also supported by one or more intermediate support rollers, approximately half of the extension of the projection is in engagement with the toothed outer surface of the drive belt when the projection is between support rollers.

28. A conveyor system for transporting a vehicle skid, the conveyor system comprising:

a frame structure extending along a longitudinal axis;

a plurality of support rollers carried by the frame section, the support rollers being journaled for rotation about axes transverse to the longitudinal axis and having a peripheral support surface for supporting the vehicle skid;

drive means for displacing the vehicle skid along the frame structure, wherein the drive means comprises at least one continuous drive belt, the drive belt having a toothed inner surface for engagement with a drive gear and a toothed outer surface for engagement with a projection on the vehicle skid; and a vehicle skid, the vehicle skid having a substantially planar support rail adapted to rest on the support surfaces of the support rollers, at least two projections for engagement with the toothed outer surface of the at least one drive belt, and at least two substantially planar support rails connected by at least one transverse frame member, wherein the transverse frame member carries the at least two projections, wherein, when the vehicle skid is supported by a conveyor system having a frame structure having a pair of parallel frame sections, at least one of at least two projections is engagable with a drive belt carried by support rollers in one frame section, and at least one of at least two projections is engagable with a drive belt carried by support rollers in the other frame section.

29. An arrangement for transporting a vehicle skid, the arrangement comprising:

one or more support rollers arranged for rotation in a frame, the one or more support rollers having a peripheral support surface configured for supporting a vehicle skid, each of the one or more support rollers being similarly configured for rotation on the frame;

a driving arrangement configured for displacing a vehicle skid along the frame, the driving arrangement have a drive belt, the drive belt having a toothed inner surface configured for engagement with a drive gear and a toothed out surface for engagement with a projection on a vehicle skid;

the frame further comprising a pair of parallel frame sections, each of the frame sections supporting a number of the one or more support rollers, each of the frame sections carrying a first end support roller at a first end of the frame section, a second end support roller at a second end of the frame section and at least one intermediate support roller located between the first end support roller and the second end support roller;

the driving arrangement further comprising a plurality of drive belts, the plurality of drive belts having a first drive belt spanning between the first end support roller and the at least one intermediate support roller and a second drive belt spanning between the at least one intermediate support roller and the second end support roller; and the one or more support rollers further comprising a belt contact surface configured for slip-free engagement with the drive belt, wherein the belt contact surface is of a toothed configuration.

30. The arrangement as recited in claim 29, wherein the at least one intermediate support roller includes more than one intermediate support roller, and further comprising a third drive belt arranged to span between adjacent intermediate support rollers.

31. The arrangement as recited in claim 30, further comprising a belt contact surface for each of the more than one intermediate support rollers, wherein the belt contact surface sufficiently wide to permit two drive belts to be adjacently carried on the belt contact surface.

32. The arrangement as recited in claim 31, further comprising a vehicle skid having a support rail adapted to rest on said peripheral support surface of the support roller and a projection for engagement with the toothed outer surface of the drive belt.

33. The arrangement as recited in claim 32 wherein the projection extends transversely to a longitudinal axis of the frame of the arrangement when the vehicle skid is supported on the support roller over a substantial entirety of the belt contact surface.

34. An arrangement for transporting a vehicle skid, the arrangement comprising:

a support roller arranged for rotation on a frame, the support roller having a peripheral support surface configured for supporting a vehicle skids; and a driving arrangement configured for displacing a vehicle skid along the frame, the driving arrangement having a drive belt, the drive belt having a toothed inner surface configured for engagement with a drive gear and a toothed outer surface for engagement with a projection on a vehicle skid, the projection being arranged on the vehicle skid so that when the skid is also supported by one or more intermediate support rollers, approximately half of an extension of the projection is in engagement with the toothed outer surface of each of two drive belts when the projection is between support rollers.

* * * * *